US 8,941,075 B2

(12) United States Patent
Lacy

(10) Patent No.: US 8,941,075 B2
(45) Date of Patent: Jan. 27, 2015

(54) BORON-COATED STRAW DETECTORS WITH SHAPED STRAWS

(71) Applicant: Jeffrey L. Lacy, Houston, TX (US)

(72) Inventor: Jeffrey L. Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 0 days.

(21) Appl. No.: 13/683,404

(22) Filed: Nov. 21, 2012

(65) Prior Publication Data

US 2014/0061489 A1     Mar. 6, 2014

Related U.S. Application Data

(60) Provisional application No. 61/562,688, filed on Nov. 22, 2011.

(51) Int. Cl.
*G01T 3/00*     (2006.01)

(52) U.S. Cl.
CPC .. *G01T 3/00* (2013.01); *G01T 3/008* (2013.01)
USPC .................................................. 250/390.01

(58) Field of Classification Search
CPC .................................................... G01T 3/00
USPC ............................... 250/390.01, 390.12
See application file for complete search history.

(56) References Cited

U.S. PATENT DOCUMENTS

| 3,860,845 | A | * | 1/1975 | Gleason et al. | ............... 376/155 |
| 7,002,159 | B2 | * | 2/2006 | Lacy | ............ 250/390.01 |
| 7,964,852 | B2 | * | 6/2011 | McCormick | ................ 250/391 |
| 8,569,710 | B2 | * | 10/2013 | Lacy | ............ 250/390.01 |
| 8,803,078 | B2 | * | 8/2014 | Xu et al. | ............... 250/269.4 |

* cited by examiner

*Primary Examiner* — David Porta
*Assistant Examiner* — Faye Boosalis
(74) *Attorney, Agent, or Firm* — Hasley Scarano, L.L.P.

(57) ABSTRACT

A system for detecting fissile materials which utilizes boron coated straw detectors in which the straws have non-circular cross sections. Embodiments include straws having star shaped cross sections of various configurations including a six pointed star. The system can include tubular housings having one or more shaped straws stacked within the housings.

21 Claims, 12 Drawing Sheets

Various Cylindrical Bundle Configurations Using Star Shapes n = 1    n = 7    n = 19    n = 31

US 8,941,075 B2

BORON-COATED STRAW DETECTORS WITH SHAPED STRAWS

GOVERNMENTAL SPONSORSHIP

This invention was made with government support under HSHQDC-12-C-00094 awarded by the Department of Homeland Security and under DTRA01-02-D-0067 awarded by the Defense Threat Reduction Agency. The government may have certain rights in the invention.

RELATED APPLICATIONS

No related applications.

REFERENCE TO A SEQUENTIAL LISTING

Not Applicable.

BACKGROUND OF THE INVENTION

The boron-coated straw (BCS) detector is based on arrays of thin walled boron-coated copper tubes. The elemental component of this detector is a long tube ("straw"), generally about 1 to 4 mm in diameter, coated on the inside with a thin layer of $^{10}$B-enriched boron carbide ($^{10}B_4C$). Thermal neutrons captured in $^{10}$B are converted into secondary particles, through the $^{10}B(n,\alpha)$ reaction:

$$^{10}B + n \rightarrow {}^7Li + \alpha \qquad (1)$$

The $^7$Li and $\alpha$ particles are emitted isotropically in opposite directions with kinetic energies of 1.47 MeV and 0.84 MeV, respectively (dictated by the conservation of energy and momentum). For a boron carbide layer that is only about 1 μm thick, one of the two charged particles will escape the wall 78% of the time, and ionize the gas contained within the straw.

Each BCS detector is operated as a proportional counter, with its wall acting as the cathode, and a thin wire tensioned through its center serving as the anode electrode, operated at a high positive potential. Primary electrons liberated in the gas drift to the anode, and in the high electric field close to the anode, avalanche multiplication occurs, delivering a very much amplified charge on the anode wire. Standard charge-sensitive preamplifier and shaping circuitry are used to produce a low noise pulse for each neutron event. Gamma interactions in the wall produce near minimum ionizing electrons that deposit a small fraction of the energy of the heavily ionizing alpha and Li products. Gamma signals are effectively discriminated with a simple pulse height threshold.

Applicant has previously published articles on BCS detection capabilities, fabrication, and development of prototypes for various applications including:

J. L. Lacy, A. Athanasiades, N. N. Shehad, R. A. Austin, C. S. Martin, "Novel neutron detector for high rate imaging applications", in *IEEE Nuclear Science Symposium Conference Record*, 2002, vol. 1, pp. 392-396;

A. Athanasiades, N. N. Shehad, C. S. Martin, L. Sun, J. L. Lacy, "Straw detector for high rate, high resolution neutron imaging", in *IEEE Nuclear Science Symposium Conference Record*, 2005, vol. 2, pp. 623-627;

J. L. Lacy, A. Athanasiades, N. N. Shehad, C. S. Martin, L. Sun, "Performance of 1 Meter Straw Detector for High Rate Neutron Imaging", in *IEEE Nuclear Science Symposium Conference Record*, 2006, vol. 1, pp. 20-26;

J. L. Lacy, A. Athanasiades, C. S. Martin, L. Sun, T. D. Lyons, "Fabrication and materials for a long range neutron-gamma monitor using straw detectors", in *IEEE Nuclear Science Symposium Conference Record*, 2008, pp. 686-691;

A. Athanasiades, N. N. Shehad, L. Sun, T. D. Lyons, C. S. Martin, L. Bu, J. L. Lacy "High sensitivity portable neutron detector for fissile materials detection", in *IEEE Nuclear Science Symposium Conference Record*, 2005, vol. 2, pp. 1009-1013;

J. L. Lacy, A. Athanasiades, C. S. Martin, L. Sun, J. W. Anderson, T. D. Lyons, "Long range neutron-gamma point source detection and imaging using unique rotating detector", in *IEEE Nuclear Science Symposium Conference Record*, 2007, vol. 1, pp. 185-191;

J. L. Lacy, L. Sun, C. S. Martin, A. Athanasiades, T. D. Lyons, "One meter square high rate neutron imaging panel based on boron straws", in *IEEE Nuclear Science Symposium Conference Record*, 2009, pp. 1117-1121; and J. L. Lacy, A. Athanasiades, L. Sun, C. S. Martin, G. J. Vazquez-Flores, "Boron coated straw detectors as a replacement for $^3$He", in *IEEE Nuclear Science Symposium Conference Record*, 2009, pp. 119-125.

J. L. Lacy, L. Sun, A. Athanasiades, C. S. Martin, R. Nguyen, and T. D. Lyons, Initial performance of large area neutron imager based on boron coated straws. IEEE 2010 Nuclear Science Symposium Conference Record, (2010) pp. 1786-1799.

J. L. Lacy, L. Sun, C. S. Martin, R. Nguyen, A. Athanasiades, and Z. Sobolewski, Initial performance of sealed straw modules for large area neutron science detectors. IEEE 2011 Nuclear Science Symposium Conference Record, (2011) pp. 431-435.

J. L. Lacy, A. Athanasiades, L. Sun, C. S. Martin, T. D. Lyons, M. A. Foss, and H. B. Haygood, Boron-coated straws as a replacement for 3He-based neutron detectors. Nuclear Instruments and Methods in Physics Research A, vol. 652 (2011), pp. 359-363.

These references are hereby incorporated by reference into this application in their entirety for all purposes.

Additionally, Applicant is the inventor of several patents and patent applications related to boron-coated straw detectors including:

U.S. Pat. No. 7,002,159 entitled "Boron-Coated Straw Neutron Detector";

U.S. Pat. No. 8,330,116 entitled "Long Range Neutron-Gamma Point Source Detection and Imaging Using Rotating Detector";

U.S. Pat. No. 8,569,710 entitled "Optimized Detection of Fission Neutrons Using Boron-Coated Straw Detectors Distributed in Moderator Material";

U.S. patent application Ser. No. 13/106,818 filed May 12, 2011, entitled "Neutron Detectors for Active Interrogation"; and U.S. patent application Ser. No. 13/106,785 filed May 12, 2011, entitled "Sealed Boron-Coated Straw Detectors in Moderator Material."

These patents and pending applications are hereby incorporated by reference in their entirety for all purposes.

Escape Efficiency

In order for neutrons stopped in the straw array to be detected, the decay fragments must escape the thin layer of $^{10}B_4C$ in each straw. The escape probability can be derived from the solid angle formed between the point of neutron interaction and the exit interface, and is written as:

$$\varepsilon_{esc} = 1 - T/(4L_\alpha) - T/(4L_{Li}), \text{ for } T \leq L_{Li} \quad (8a)$$

$$= 1/2 + L_{Li}/(4T) - T/L_\alpha, \text{ for } L_{Li} < T \leq L_\alpha \quad (8b)$$

$$= (L_\alpha + L_{Li})/(4T), \text{ for } T > L_\alpha \quad (8c)$$

where T is the film thickness, and $L_\alpha$ and $L_{Li}$ are the ranges of the $\alpha$ and $^7$Li, respectively, inside the $^{10}B_4C$ film, equal to $L_\alpha$=3.30 μm and $L_{Li}$=1.68 μm. The ranges were computed in SRIM-2006.02 (http://www.srim.org/) for a target layer of $^{10}B_4C$ with a density of 2.38 g/cm$^3$ and for ion energies of 1.47 MeV for alphas and 0.84 MeV for $^7$Li. The escape efficiency computed here is slightly underestimated, because for simplicity we only considered the dominant branch of the $^{10}B(n,\alpha)$ reaction. The other branch (6% of cases) generates more energetic products, which have slightly better chances for escape. Equation (8) has been evaluated for T values up to 10 μm, and is plotted in FIG. 8. For a $^{10}B_4C$ film thickness of 1.0 μm, the escape efficiency is 78%.

SUMMARY OF THE INVENTION

The present invention includes an improved boron-coated straw detector wherein the straw tubes have a cross sectional design of a non-circular shape (other than round) to increase detection efficiency when compared to straws of the same diameter having a round shape. Applicant has discovered that forming straw tubes of the detector into various shapes which increase the straw surface area coated with boron and/or which increase the stacking efficiency of the straws in a support tube can increase the detector efficiency when compared to traditional round straw designs of the same overall diameter. One embodiment of the present invention includes a straw wall design that increases the amount of sensitive area coated with boron as compared to a single round tube straw of the same diameter. Another embodiment of the present invention includes a straw wall design that is shaped in the form of a star. As used herein, star is intended to encompass its broadest meaning including but not limited to polygons having alternating angular projections (i.e. points and valleys) or other corrugated shapes.

In another embodiment of the invention, the star shaped straw's cross section is in the form of a six pointed star design. In an additional embodiment of the invention, the star shaped straw wall is formed into a six pointed star design wherein points and valleys are rounded, and the radius of the outer portion of the points is the same or about the same as the radius of the valleys. This embodiment can be used with great advantage to achieve denser packing when shapes are bundled into arrays. In cases where only one shaped straw is included in a containment tube (tubular housing), shapes with larger numbers of points such as 12 or 18 points may be used to advantage. In such cases asymmetrical point/valley radii in which the valley radius is reduced can be employed to advantage to achieve greater intensity of electric field at the point of the star. An additional embodiment of the invention includes a boron coated straw detector wherein at least one shaped straw is enclosed inside a tubular housing. Yet another embodiment of the invention includes a boron coated straw detector system having more than one tubular housing, each housing including at least one and as many as 200 shaped straws.

DETAILED DESCRIPTION OF THE INVENTION

Detection Efficiency

Figure 1:
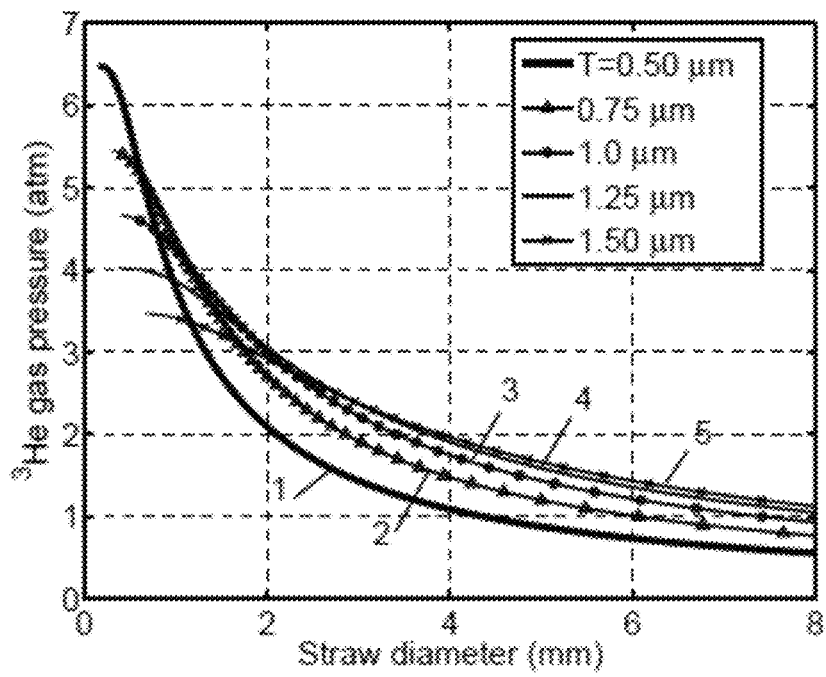
FIG. 1 is a graphical representation of the relationship between equivalent $^3$He gas pressure and straw diameter employed in a close packed array of straws.

It is useful to express the detection efficiency of the BCS detector in relation to the detection efficiency of the $^3$He medium. For equivalency in detection of thermal neutrons, the following expression must hold:

$$1-e^{-N_{3He}\sigma_{3He}t}=\epsilon_{th}\epsilon_{esc}(1-e^{-N_{10B}\sigma_{10B}t}) \quad (2)$$

where $N_{[\,]}$ is the number of atoms per unit volume, $\sigma_{[\,]}$ is the neutron cross-section, t is the detector depth in the direction of irradiation, $\epsilon_{th}$ is the counting threshold efficiency (~95%), and $\epsilon_{esc}$ is the escape efficiency of the $^{10}$B(n,α) reaction products, discussed in the Appendix. For thermal energy neutrons (0.0253 eV), the $^3$He reaction cross-section is $\sigma_{3He}$=5330 barn, and for the boron reaction, $\sigma_{10B}$=3840 barn.

The atomic density of $^3$He gas at pressure P (in atm) is:

$$N_{3He}=2.69\times10^{19}P \quad (3)$$

The atomic density of $^{10}$B can be written as $N_{10B}=f_v \cdot N$, where $f_v$ is the fraction of volume occupied by the $^{10}$B$_4$C layer, and N is the atomic density of $^{10}$B in $^{10}$B$_4$C (1.10×10$^{23}$ atoms/cm$^3$). For a close-packed array of straw detectors, the factor $f_v$ can be approximated as $f_v=\pi T/(0.866 D)$, where D is the straw diameter, and T is the $^{10}$B$_4$C film thickness in each straw. Thus we write:

$$N_{10B}=1.10\times10^{23}\pi T/[0.866D] \quad (4)$$

Substituting Eq. (4) and (3) into Eq. (2), and solving for D we arrive at an expression that relates the $^3$He gas pressure P to the straw diameter D:

$$D = -1532 T t/\ln\left(1-\frac{1-e^{-0.143Pt}}{\varepsilon_{th}\varepsilon_{esc}}\right) \quad (5)$$

$$\text{for } P < -\ln(1-\varepsilon_{th}\varepsilon_{esc})/(0.143t)$$

where T and t are in cm. The above relation is valid only while the term inside the logarithm is positive, i.e., the product $\epsilon_{th}\epsilon_{esc}$ is larger than the detection efficiency for $^3$He.

FIG. 1 shows a graphical representation of Eq. (5), with the $^3$He gas pressure P plotted on the y-axis, and the straw diameter D plotted on the x-axis. Each curve corresponds to a different $^{10}$B$_4$C film thickness T as shown in the following table:

| | |
|---|---|
| Curve 1 | 0.50 μm |
| Curve 2 | 0.75 μm |
| Curve 3 | 1.00 μm |
| Curve 4 | 1.25 μm |
| Curve 5 | 1.50 μm |

All curves assume the same detector depth of t=1.99 cm, which is the mean depth seen by a collimated beam of neutrons incident on the side of a 2.54 cm (1 inch) diameter tube filled with either $^3$He gas at pressure P, or with straw detectors of diameter D. For instance, when this tube is filled with D=1 mm straws, coated with 0.75 μm thick $^{10}$B$_4$C, the achieved detection efficiency is equivalent to that obtained in a 1-inch $^3$He tube pressurized to 4.3 atm. The number of straws equals about 585.

Figure 2:
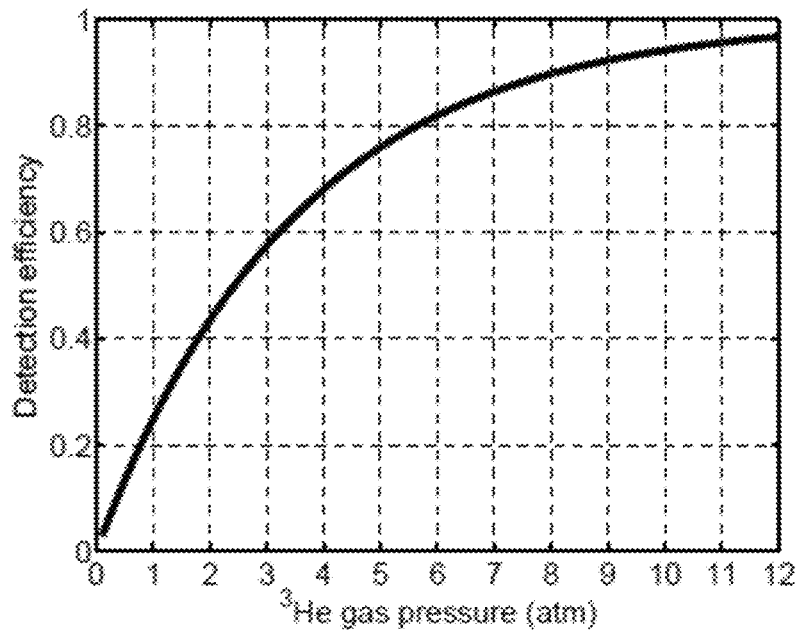
FIG. 2 is a graphical representation of the intrinsic efficiency of a 1-inch diameter $^3$He tube as a function of pressure.
Figure 3:
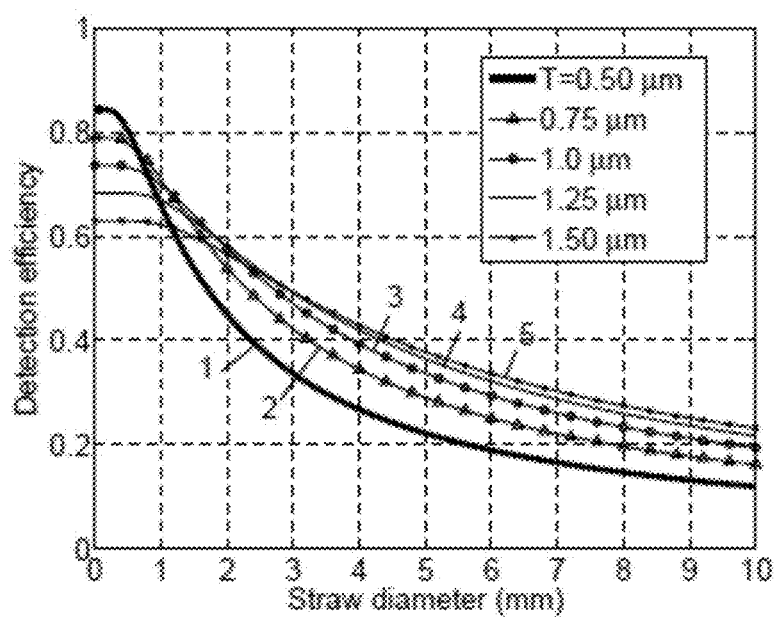
FIG. 3 is a graphical representation of the intrinsic detection efficiency of a 1-inch diameter tube filled with boron coated straw detectors, as a function of straw diameter.

The intrinsic thermal neutron detection efficiencies for either detection medium are plotted in FIGS. 2 and 3. FIG. 2 is the intrinsic detection efficiency of a 1-inch $^3$He tube as a function of pressure. In the case of $^3$He, the efficiency is plotted vs. the gas pressure. FIG. 3 is the detection efficiency of a 1-inch tube filled with BCS detectors, as a function of straw diameter. In the case of $^{10}$B$_4$C coated straws, the efficiency is plotted vs. straw diameter with the curves 1 through 5 representing the same thickness as shown above for FIG. 1. A detector depth of 1.99 cm is assumed in both cases, as before. For the example given above, i.e. 1 mm straws with 0.75 μm thick $^{10}$B$_4$C, the detection efficiency is 71%; the same efficiency is obtained with $^3$He gas at 4.3 atm.

Detector Design and Performance Estimates

Figure 4:
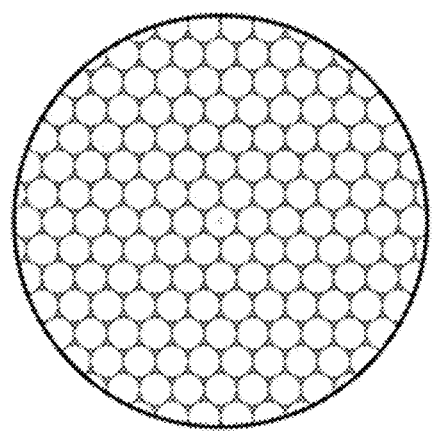
FIG. 4 is a cross-section of straw detector design having a 1-inch aluminum tube packed with 2 millimeter diameter straw detectors.

One embodiment of the straw detectors includes a straw-based detector design as illustrated in FIG. 4. A 1-inch diameter outer aluminum tube is filled with a close-packed array of 2 mm straw detectors. This external tube can be easily sealed, using aluminum/ceramic end-caps. It thus allows operation of the straw detectors in sealed mode, for indefinite periods of time. A gas port installed in one end-cap allows purging with the desired gas mixture, then sealing at an appropriate pressure below 1 atm. The length of each BCS detector matches the length of the outer tube, which can be set as desired. The diameter of straws can be selected to achieve the desired detection efficiency, as discussed earlier. Table 1 indicates the detection efficiency that can be achieved for this design (1-inch tube) and the required number of straw detectors.

TABLE 1

| Straw diameter (mm) | Number of straws in 1-inch tube | Film thickness (μm) | Detection efficiency (thermal neutrons) | Optimal film thickness (μm) | Detection efficiency at optimal thickness (thermal neutrons) |
|---|---|---|---|---|---|
| 1.0 | ~585 | 0.75 | 71% | 0.82 | 71% |
| 2.0 | ~146 | 0.75 | 54% | 1.17 | 58% |
| 3.0 | ~65 | 0.75 | 42% | 1.39 | 49% |
| 4.0 | ~37 | 0.75 | 34% | 1.54 | 43% |

It should be pointed out that significant cost savings can be achieved with larger diameter straws, since the number of straws required will be very low, say 65 3-mm straws vs. 585 1-mm straws. At the same time, the reduction in efficiency is tolerable (49% vs. 71%).

Shaped Straws

Figure 5:
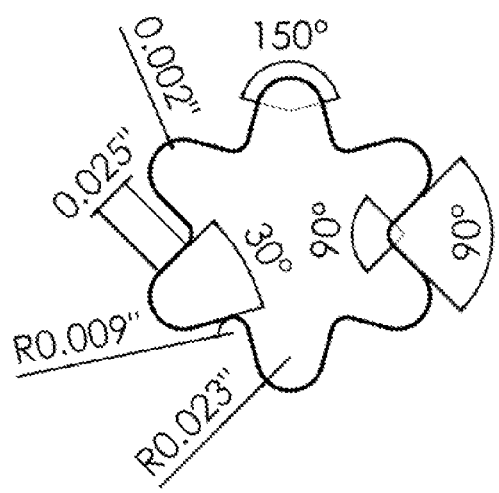
FIG. 5 is a cross-section of one embodiment of the present invention having a star shape.
Figure 6:
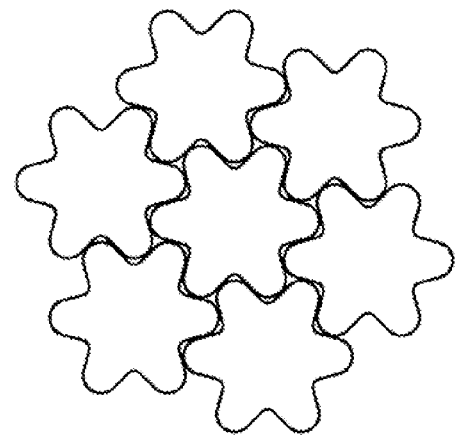
FIG. 6 is a cross-section of one embodiment of the present invention composed of densely packed star-shaped straw detectors.

In order to further reduce the number of individual straw elements required to achieve the desired efficiency, another embodiment of the present invention includes a star-shaped straw detector, as shown in FIG. 5. Although FIG. 5 shows a 6-pointed star shape, other shapes are also within the scope of the present invention (for example, see FIGS. 10, and 14-18). This new design introduces a shaped straw wall that increases the sensitive area coated with boron carbide, when compared to a single straw of the same diameter. At the same time, it allows straw detectors to be packed more densely, as shown in FIG. 6. The overall improvement is a two-fold reduction in the number of straw detectors required.

It can be shown that the formula that relates the diameter D of the round straw presented earlier, to the diameter of the circle that encloses the star-shaped straw such as shown in FIG. 5, call it Dc (circumscribed circle), is $$Dc=1.75 \cdot D \quad (7)$$

For instance, a close-packed array of 3 mm straws can be replaced by a close-packed array of star straws with circumscribed diameter 3.1.75=5.25 mm. Table 2 lists the diameter and number of star-shaped straws required to achieve the detection efficiency calculated previously for the round straws (Table 1). Thus, only ~33 star-shaped straws are required to achieve the same detection efficiency as ~65 round straws. This reduction represents a significant saving in production and labor costs associated with the fabrication of end-fittings and the wiring of individual straw detectors.

TABLE 2

| | Round straws | Star-shaped straws | | | |
|---|---|---|---|---|---|
| Straw diameter (mm) | Number of straws in 1-inch tube | Straw diameter (circumscribed) (mm) | Number of straws in 1-inch tube | Optimal film thickness (μm) | Detection efficiency at optimal thickness (thermal neutrons) |
| 1.0 | ~585 | 1.75 | ~293 | 0.82 | 71% |
| 2.0 | ~146 | 3.50 | ~73 | 1.17 | 58% |
| 3.0 | ~65 | 5.25 | ~33 | 1.39 | 49% |
| 4.0 | ~37 | 7.00 | ~19 | 1.54 | 43% |

Additionally, we find that the star shaped structure imparts an important longitudinal stability to each individual straw allowing them to be much more easily positioned in the illustrated close packed format shown in FIG. 6.

Figure 7A:
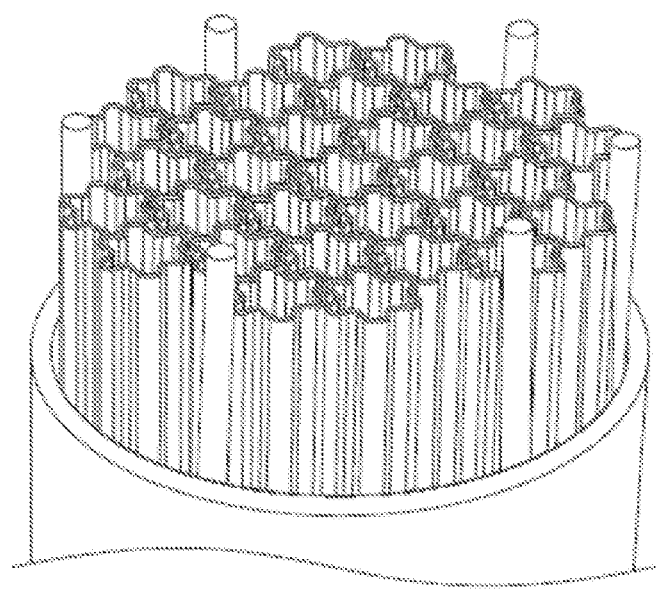
FIG. 7a shows a detectors containing 31 star-shaped Boron-10 Carbide coated straws contained inside a gas containment tube.

An actual detector embodiment is pictured in FIG. 7a. Here 31 thin walled star straws are packed inside a 1"-diameter aluminum tube. The thickness of the wall of the straw can be made very small, in this example 0.001". This is possible by virtue of the support each straw provides for its neighbors.

Figure 7B:
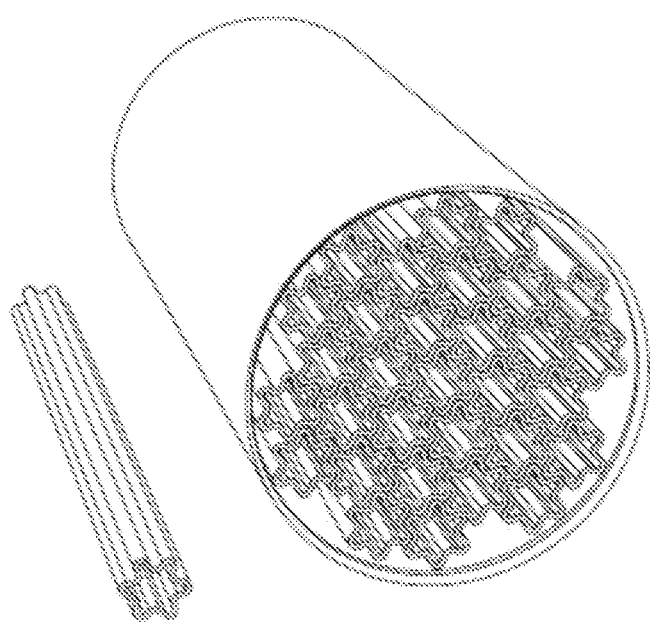
FIG. 7b is a model of star-shaped detectors inside an aluminum tube.
Figure 8:
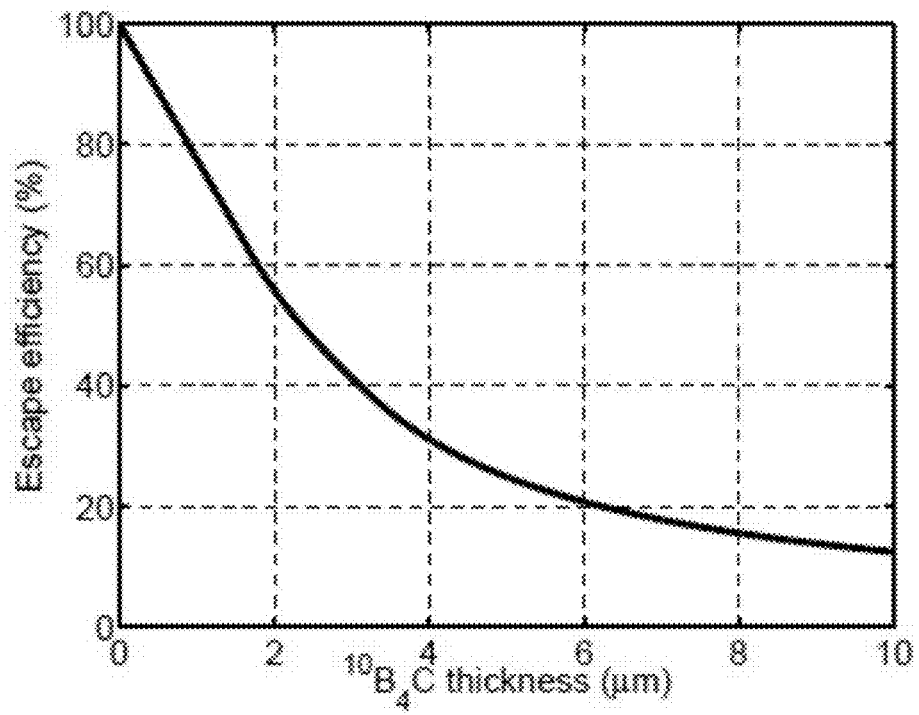
FIG. 8 is a graphical representation of the escape efficiency for $^{10}B(n,\alpha)$ reaction products.

A mock-up of an embodiment of a detector is pictured in FIG. 7b. Here, a commercially available brass extrusion was used to shape the straw, and 31 of these extrusions are packed inside a 1"-diameter aluminum tube. The corrugated straw detectors of the present invention will preferably have a much thinner wall (in the order of about 0.001" thick). FIG. 7b illustrates the manner with which the straws can be packed inside the cylindrical tube.

Figure 9:
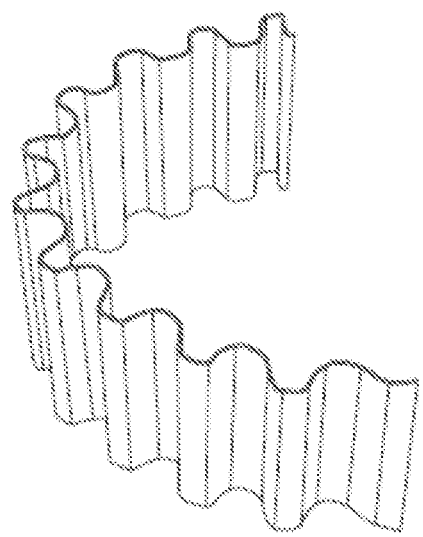
FIG. 9 is a sample strip of a corrugated copper Boron-10 Carbide coatedfoil which may be utilized in the present invention.
Figure 10:
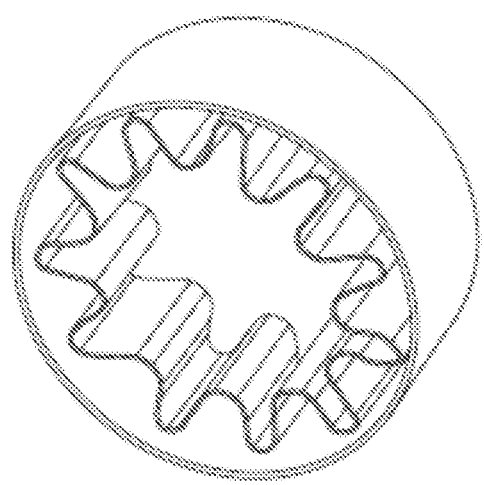
FIG. 10 shows a sample of a corrugated copper foil positioned inside an aluminum tube or housing illustrating one method of construction of a Boron Carbide coated corrugated straw.
Figure 11:
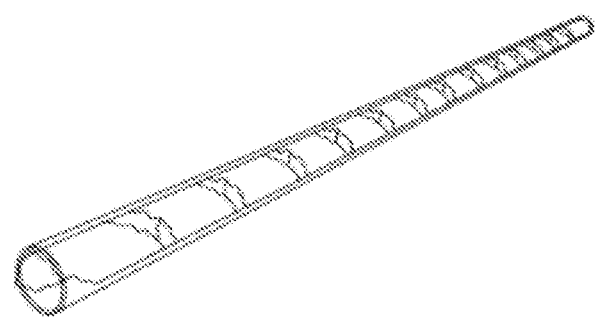
FIG. 11 depicts an embodiment of the present invention wherein corrugated copper foil has been coiled inside a straw-like housing illustrating a method of construction or a Boron-10 Carbide coated corrugated detector.
Figure 12:
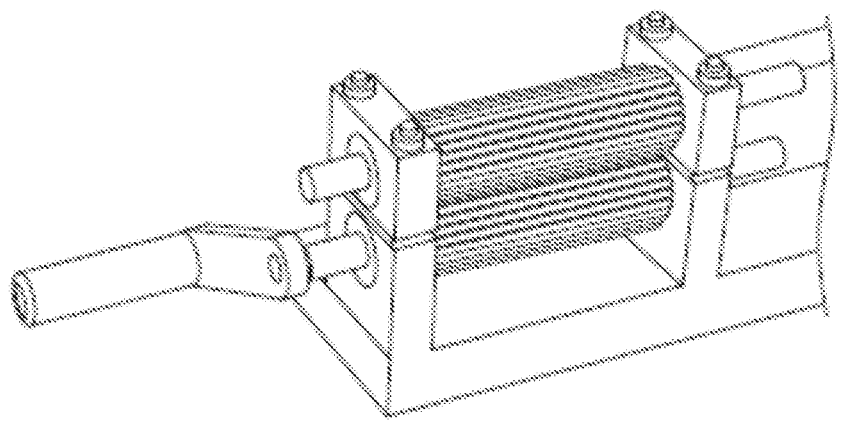
FIG. 12 is an example of a foil corrugating device such as can be utilized to manufacture an embodiment of the present invention.

FIGS. 9, 10, and 11 illustrate other embodiments of the present invention in which Boron coated foil is corrugated into one of many unique geometries through use of intermeshing gears shown in FIG. 12. Such corrugated foil can in turn be housed in gas sealed aluminum tubes to form active detectors. The copper foil can preferably be corrugated after PVD coating with boron-10 carbide. Use of Boron-10 Carbide applied by PVD technique produces an extremely resilient coating capable of withstanding high stresses that can be induced during fabrication. The total boron-carbide coated area can be increased by factors ranging from 1.15 up to more than 2.0 by this simple process. The present invention is not limited to any method of manufacture of the shaped straws. FIGS. 9 and 10 also illustrate that embodiments of the present invention can include star shapes with any number of undulating projection points and valleys. FIG. 10 specifically shows a ten pointed star.

FIG. 11 depicts an embodiment of the present invention wherein corrugated, boron-carbide coated copper film has been spiral wound or coiled inside a straw-like housing.

FIG. 12 is an example of a foil corrugating device such as can be utilized to manufacture an embodiment of the present invention. Other similar devices or other methods of forming straws can also be utilized.

Figure 13:
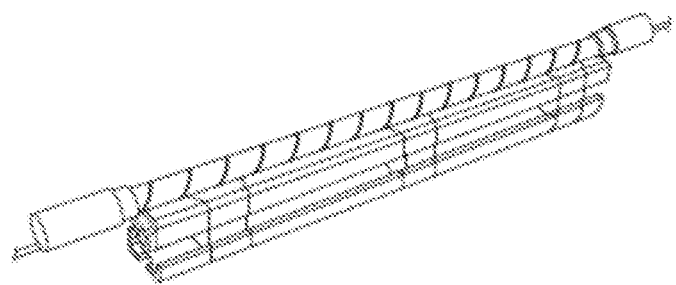
FIG. 13 is an embodiment of a Boron-10 Carbide coated straw detector of the present invention inclusive of end caps and internal anode wire.

FIG. 13 is an embodiment of a straw detector of the present invention having a spiral shaped corrugated foil inside a tube, along with end caps and internal wires.

Figure 14:
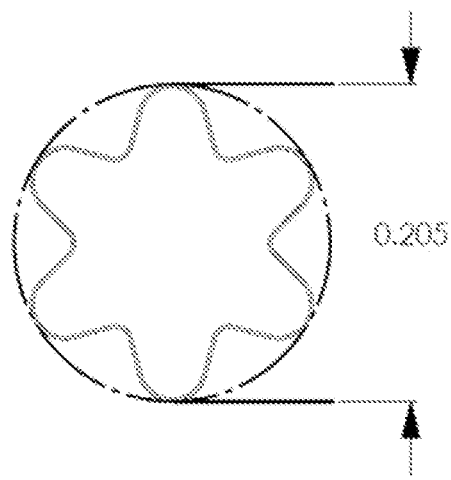
FIG. 14 is a cross-section of a detector of the present invention having a six-pointed star shape.

As shown in FIG. 14, the cross-section of an embodiment of a corrugated straw detector can be a six-pointed star. In one particular embodiment having the configuration of FIG. 14, the straws include the following parameters: 0.205" diameter; circumscribed circle perimeter=0.6437"; 7 star shape perimeter=0.746"; perimeter ratio=1.16; and surface area increase=16%.

Figure 15:
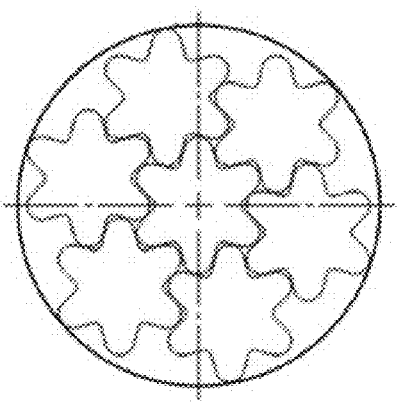
FIG. 15 is a cross-section of an embodiment of a detector of the present invention with seven corrugated straws bundled together within a gas containment tube (tubular housing).

As shown in FIG. 15, the six-pointed star detectors of FIG. 14 can be bundled together to increase surface area. In a particular embodiment having the configuration of FIG. 15, the bundle includes a housing tube of 0.5348" outside diameter and the following parameters: circumscribed circle perimeter=1.68"; 7 regular (round) straws total perimeter=3.918"; 7 star straws total perimeter=5.222"; perimeter ratio=1.33; and surface area increase=33%.

Figure 16:
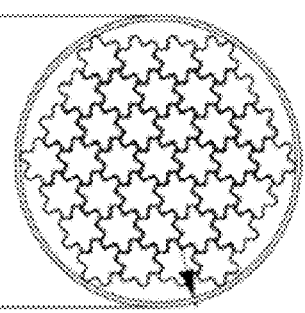
FIG. 16 is a cross-section of an embodiment of the present invention having 37 close-packed straws inside a circular shaped gas containment housing.
Figure 17:
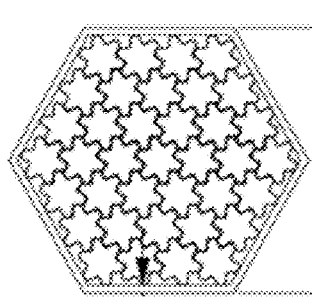
FIG. 17 is a cross-section of an embodiment of the present invention having 37 multiple close-packed straws inside a hexagonal shaped housing.

As demonstrated in FIGS. 16 and 17, the present invention includes various embodiments having different sizes and shapes of straws and bundles. FIG. 16 is a cross-section of an embodiment having closely packed straws inside a circular shaped housing tube. In a particular embodiment having a configuration such as of FIG. 16, the outside diameter of the housing is 1.242" and the thickness of the tube wall is 0.020". FIG. 17 is another embodiment having closely packed straws inside a hexagonal shaped housing tube. In a particular embodiment having a configuration of FIG. 17, the outside diameter of the housing is 1.129" and the thickness of the tube is 0.031". In these non-limiting examples, the total number of tubes within the housing tube is 37.

Figure 18:
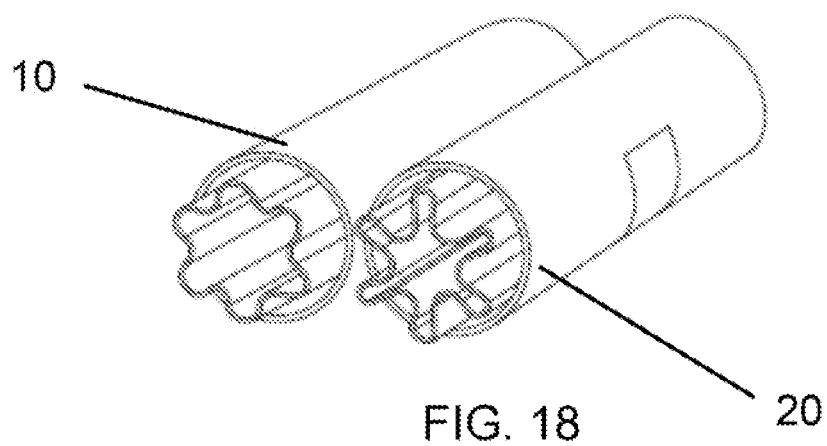
FIG. 18 shows two embodiments of star shaped straws of the present invention illustrating how the spring of the star shape is used to assure secure positioning of the star within the gas containment tube.

FIG. 18 shows mock ups of two embodiments of star straw package design. The straws of embodiment 10 and 20 demonstrate that even for star shapes having the same number of points, in this case six pointed stars, the cross sectional area of various embodiments within the scope of applicant's invention can be differently configured by varying the radius of curvature of the points, as well as the depth and curvature of the valleys. The straw 20 having an outer diameter of 0.250" and point/valley diameters of 0.036" significantly increases the total surface area to a factor of 1.4 compared to only 1.16 achieved with straw 10. Therefore the efficiency of detection can likewise be significantly increased as compared to the straw 10.

FIG. 18 also demonstrates that an embodiment of applicant's invention likewise includes a single shaped straw contained within a housing tube. While the embodiments 10 and 20 are six pointed shaped stars of varying configurations, star shapes of can be utilized alone within a housing tube or in multiples packed within a housing tube. In one particular non-limiting embodiment that has been developed, a twelve pointed star shape was utilized.

In a preferred embodiment, FIG. 18 straw 20, the star shaped straw includes a six pointed star shape wherein the radius of the star points and the radius of the star valleys are the same or very similar. This similarity of curvature together with the 6 pointed form allows more efficient packing within the housing tube.

Figure 19:
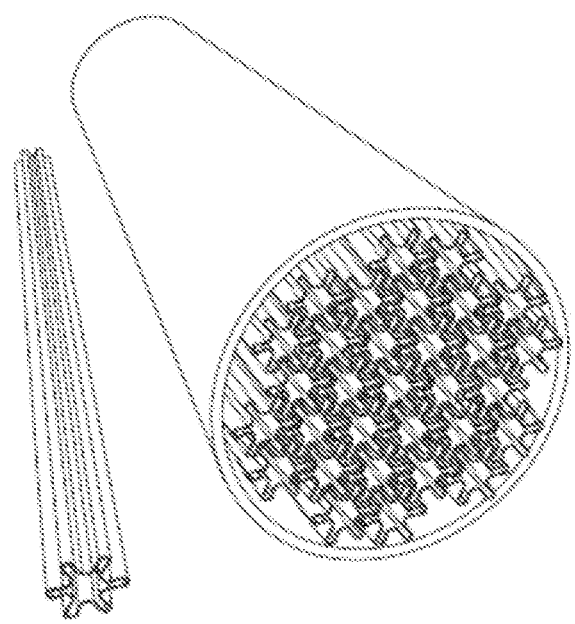
FIG. 19 shows yet another embodiment of the invention in which 31 star shaped straws are tightly packed into a 1.25" OD cylindrical containment vessel.

In another preferred embodiment of the invention shown in FIG. 19, the cross sectional area of the star shaped straws within a housing tube can be configured to significantly increase the total surface area such that total sensitive material in the coating will be the equivalent to a $^3$He detector at 2.7 atmosphere pressure.

Figure 20:
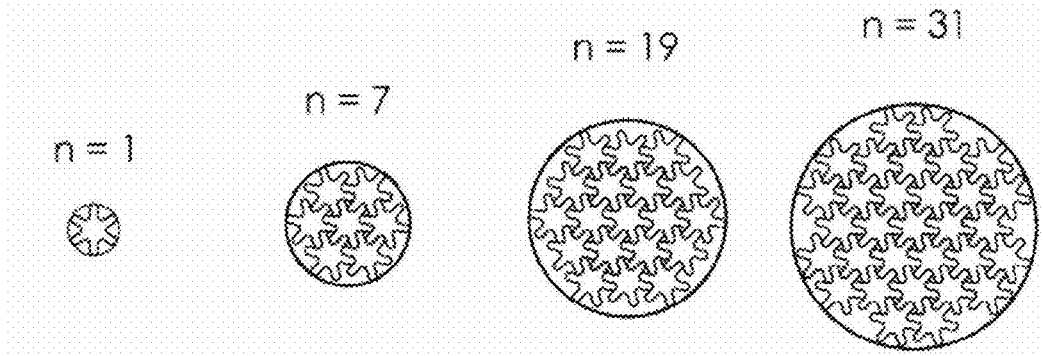
FIG. 20 shows a series of embodiments of detectors utilizing optimal packing of star shaped straws in progressively larger cylindrical gas containment tubes.

FIG. 20 illustrates various embodiments of cylindrical detector configurations that can be achieved using the basic straw shape of FIG. 18, 21.

Figure 21:
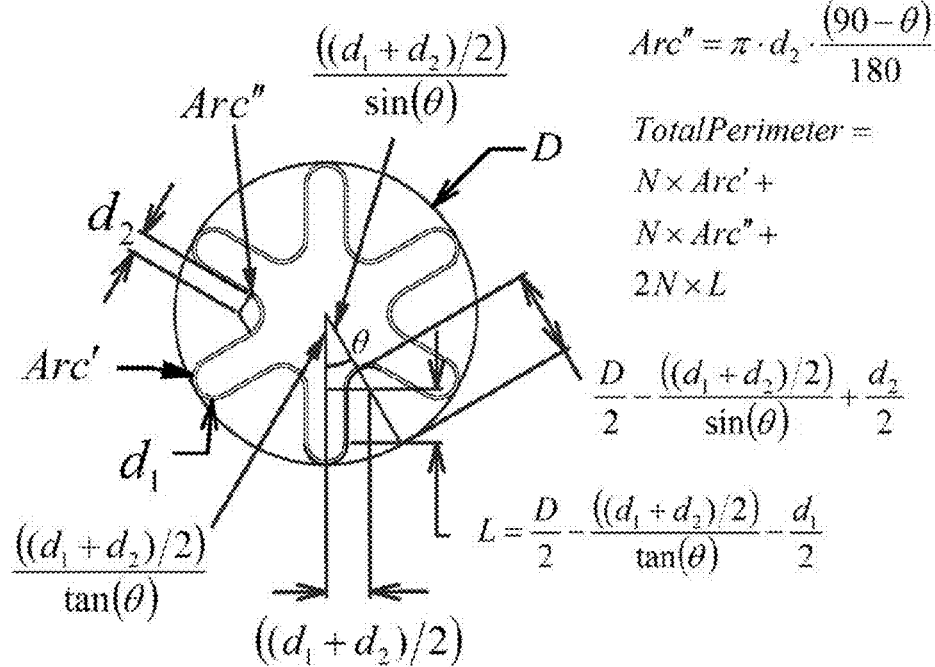
FIG. 21 illustrates one possible analytical geometrical form for an embodiment of an N pointed star composed of circular arcs of diameter $d_1$ and $d_2$, having parallel point sides and an outer diameter D. Such forms with d1=d2, and N=6 can be employed with advantage to enhance density of packing for multiple star detectors.
Figures 22A, 22B, 22C, 22D, 22E, 22F:
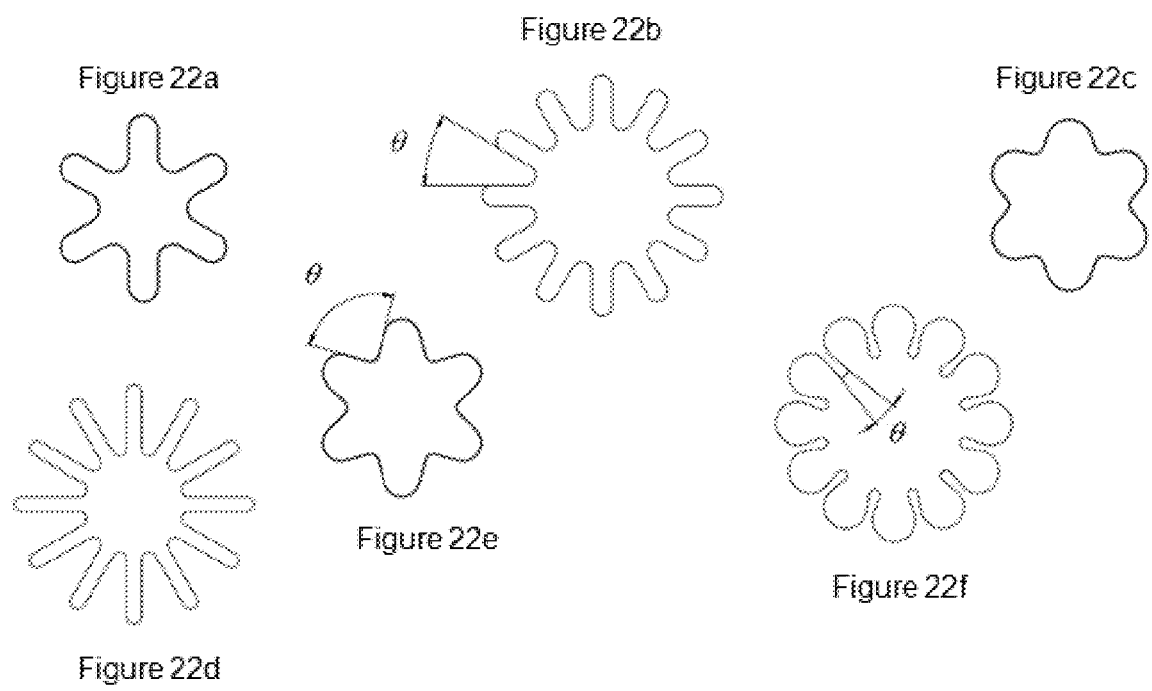
FIGS. 22a-f illustrate some of the possible star shapes that can be employed as embodiments of this invention.

FIG. 21 illustrates formalism for the geometry of an embodiment of a star shape that is particularly advantageous for simplicity and efficiency of production. Simple expressions are shown for the wall perimeter dimension L whose ratio with the outer circular circumference D defines the sensitivity benefit achieved by use of corrugation.

The foregoing disclosure and description of the invention are illustrative and explanatory thereof and various changes in the details of the illustrated apparatus and construction and method of operation may be made without departing from the spirit in scope of the invention.

The invention claimed is:

1. An improved boron-coated straw detector system comprising a boron-coated straw having a star-shaped cross section.

2. The boron-coated straw detector system of claim 1, wherein the star-shaped straw is enclosed within a tubular housing.

3. The boron-coated straw detector system of claim 1, wherein the straw's star shaped cross section comprises a star shape having between 3 and 24 points.

4. The boron-coated straw detector system of claim 1, wherein the straw's star shaped cross section comprises a star shape having 6 points.

5. The boron-coated straw detector system of claim 1, wherein the outer portion of the star's point are rounded.

6. The boron-coated straw detector system of claim 1, wherein the star's valleys are rounded.

7. The boron-coated straw detector system of claim 1, wherein the star's valleys are rounded and the outer portion of the star's point are rounded, and both the outer portion of the points and the valleys have about the same radius of curvature.

8. The boron-coated straw detector system of claim 1, wherein the outer portion of the star's points define a circle circumscribing the straw and wherein each of the star's valley's have approximately the same depth relative to the circumscribed circle.

9. The boron-coated straw detector system of claim 1, wherein the straw's star shaped cross section comprises a star shape having 6 points, and wherein the star's valleys are rounded and the outer portion of the star's point are rounded, and both the outer portion of the points and the valleys have about the same radius of curvature facilitating more efficient packing of straw numbers within a housing.

10. An improved boron-coated straw detector system comprising a plurality of boron-coated straws having a star-shaped cross sections.

11. The boron-coated straw detector system of claim 10, wherein each of the plurality of straws has approximately the same cross sectional shape.

12. The boron-coated straw detector system of claim 10, wherein more than one star-shaped straw is enclosed within a tubular housing.

13. The boron-coated straw detector system of claim 10, wherein the system comprises multiple tubular housing, each tubular housing surrounding more than one straw having a star shaped cross section.

14. The boron-coated straw detector system of claim 13, wherein the straws's star shaped cross sections comprise star shapes having 6 points.

15. The boron-coated straw detector system of claim 13, wherein the straw's star shaped cross section comprises a star shape having 6 points, and wherein the star's valleys are rounded and the outer portion of the star's point are rounded, and both the outer portion of the points and the valleys have about the same radius of curvature.

16. An improved boron-coated straw detector system comprising a plurality of boron-coated straws formed from boron coated copper foil, said formed straws having a star-shaped configuration.

17. The boron-coated straw detector system of claim 16, further comprising one tubular housing for each star-shaped straw, each tubular housing enclosing a single star-shaped straw.

18. The boron-coated straw detector system of claim 16, further comprising at least one tubular housing, said tubular housing enclosing a plurality of star-shaped straws.

19. The boron-coated straw detector system of claim 16, wherein the outer portions of the stars' points and the inner most portions of the stars' valleys are rounded.

20. The boron-coated straw detector system of claim 16, wherein the perimeter of a star-shaped straw is at least about 1.15 times larger the circumference of a circle that circumscribes the star-shape straw.

21. The boron-coated straw detector system of claim 16, wherein wherein the perimeter of a star-shaped straw is at least about 1.75 times larger the circumference of a circle that circumscribes the star-shape straw.

\* \* \* \* \*